(12) United States Patent
Ozai et al.

(10) Patent No.: US 6,306,999 B1
(45) Date of Patent: Oct. 23, 2001

(54) ROOM TEMPERATURE CURABLE ORGANOPOLYSILOXANE COMPOSITION

(75) Inventors: Toshiyuki Ozai, Takasaki; Mikio Shiono, Annaka, both of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/349,507

(22) Filed: Jul. 9, 1999

(30) Foreign Application Priority Data

Jul. 10, 1998 (JP) .................................................. 10-211897

(51) Int. Cl.⁷ .................................................... C08G 77/08
(52) U.S. Cl. ................................ 528/15; 528/18; 528/19; 528/38; 528/31; 528/901; 528/25; 428/447; 524/731
(58) Field of Search .............................. 528/31, 901, 25, 528/38, 15, 18, 19; 428/447; 524/731

(56) References Cited

U.S. PATENT DOCUMENTS

| | | | |
|---|---|---|---|
| 5,319,050 | * | 6/1994 | Kimura et al. .......................... 528/12 |
| 5,424,383 | * | 6/1995 | Kimura et al. .......................... 528/12 |
| 5,502,096 | * | 3/1996 | Kimura et al. ......................... 524/356 |
| 5,506,302 | * | 4/1996 | Shiono et al. ......................... 524/731 |

* cited by examiner

*Primary Examiner*—Margaret Moore
(74) *Attorney, Agent, or Firm*—Oblon, Spivak, McClelland, Maier & Neustadt, P.C.

(57) ABSTRACT

A room temperature curable organopolysiloxane composition comprising (A) a diorganopolysiloxane both-side terminated with hydroxyl groups, represented by the general formula: $HO(R^1_2SiO)_nH$ (wherein $R^1$ represents a monovalent substituted or unsubstituted hydrocarbon group, and n represents an integer of 150 or more), (B) an organohydrogenpolysiloxane having in one molecule at least three hydrogen atoms bonded to silicon atoms, (C) a compound selected from the group consisting of an organosilane having in one molecule at least two alkoxyl groups bonded to silicon atoms and containing at least one primary amino group bonded to a silicon atom through an alkylene group and a partial hydrolysis-condensation product thereof, (D) a metal fatty acid salt, and (E) an organic compound having at least one C=O group in one molecule, capable of reacting the primary amino group of the component-(C) to form water. Using this composition, cured films having superior tack-free properties, lubricity and wear resistance can be formed on the surfaces of rubber substrates in higher rapid-curing performance and rapid adhesion development. An article making use of such a composition is also provided.

25 Claims, No Drawings

ROOM TEMPERATURE CURABLE ORGANOPOLYSILOXANE COMPOSITION

BACKGROUND OF THE INVENTION

1. Field of the Invention

This invention relates to a room temperature curable organopolysiloxane composition having rapid-curing performance and rapid adhesion development and suited as coatings on various substrates, in particular, rubber substrates.

2. Description of the Prior Art

Silicone type coating compositions have been used so that tack-free properties, lubricity and wear resistance can be imparted to the surfaces of rubber substrates or the like. In particular, diorganopolysiloxanes both-side terminated with hydroxyl groups, organopolysiloxanes and/or organoalkoxysilane containing hydrogen atoms bonded to silicon atoms (i.e., Si—H groups), and mixtures or reaction products of organopolysiloxanes containing organotin compounds, glycidoxy groups or epoxy groups such as epoxycyclohexyl groups with amino-group-containing alkoxysilanes and/or siloxanes (e.g., Japanese Patent Publications (Kokoku) No. 54-43023, No. 56-19813 and No. 56-47864) are improved in adhesion to substrates and also in wear resistance and lubricity.

However, such conventional silicone type coating compositions take fully twenty-four hours or longer until they become cured completely under room temperature conditions to develop adhesion properties, thus they have had a very poor operability. Also, when they are made into heat-curing types, they can rapidly cure and develop adhesion properties, but have had many problems such that assemblies and so forth for such heating impose a high cost and are unprofitable. Accordingly, proposed in Japanese Laying-open Patent Publication (Kokai) No. 5-279570 (JP 5-279570 A) is a room temperature curable organopolysiloxane composition containing a primary amine and a compound containing a C=O group. This composition, however, has insufficient adhesion development, lubricity and wear resistance.

Thus, it has strongly been sought to provide a material having both the rapid-curing performance (in particular, deep-curing performance) and the rapid adhesion development.

SUMMARY OF THE INVENTION

The present invention was made taking account of the above circumstances. Accordingly, an object of the present invention is to provide a room temperature curable organopolysiloxane composition with which cured films having superior tack-free properties, lubricity and wear resistance can be formed on the surfaces of various substrates, in particular, rubber substrates in higher rapid-curing performance and rapid adhesion development than ever.

To achieve the above object, the present invention provides a room temperature curable organopolysiloxane composition comprising:

(A) 100 parts by weight of a diorganopolysiloxane both-side terminated with hydroxyl groups, represented by the general formula (1):

  (1)

wherein R¹ represents a monovalent substituted or unsubstituted hydrocarbon group, and n represents an integer of 150 or more;

(B) from 1 part by weight to 30 parts by weight of an organohydrogenpolysiloxane having in one molecule at least three hydrogen atoms bonded to silicon atoms;

(C) from 5 parts by weight to 150 parts by weight of a compound selected from the group consisting of an organosilane having in one molecule at least two alkoxyl groups bonded to silicon atoms and containing at least one primary amino group bonded to a silicon atom through an alkylene group and a partial hydrolysis-condensation product thereof;

(D) from 0.1 part by weight to 15 parts by weight of a metal fatty acid salt; and (E) an organic compound having at least one C=O group in one molecule, capable of reacting the primary amino group of the component (C) to form water; the compound being in such an amount that the C=O group is in a content of from 0.001 mole to 10 moles per mole of the primary amino group of the component (C).

The present composition may further comprise as component (F) a non-reactive diorganopolysiloxane represented by the general formula (2):

  (2)

wherein R² represents a monovalent substituted or unsubstituted hydrocarbon group, and m represents an integer of 150 or more; in an amount of from 5 to 80 parts by weight based on 100 parts by weight of the component (A).

The present invention also provides an article comprising a substrate on which a cured film of the organopolysiloxane composition described above has been formed.

The present inventors have discovered that the primary amino group in the component-(C) primary-amino-group-containing organosilane and/or a partial hydrolysis-condensation product thereof reacts with the C=O group in the component-(E) C=O-group-containing organic compound at the time of mixing to form water and the water thus formed accelerates the curing reaction (curability) and development of adhesion properties of the composition, and also that the dehydration condensation reaction caused by using the component-(B) in combination cooperatively brings about an improvement in curing performance and adhesion properties. Thus, they have accomplished the present invention.

DETAILED DESCRIPTION OF THE PREFERRED EMBODIMENTS

The present invention will be described below in detail.

The organopolysiloxane composition of the present invention is constituted of the following components (A) to (E), and may optionally further contain the following component (F).

Component (A)

The component-(A) diorganopolysiloxane both-side terminated with hydroxyl groups is a compound represented by the general formula (1) shown below, and is the main component that reacts with Si—H groups of the component-(B) and alkoxyl groups of the component-(C) to cure to form a film having especially good tack-free properties.

  (1)

Here, in the above formula, R¹ represents a monovalent substituted or unsubstituted hydrocarbon group, and may preferably be those having 1 to 8 carbon atoms, and particularly 1 to 6 carbon atoms, as exemplified by alkyl groups such as a methyl group, an ethyl group, a propyl group, an isopropyl group, a butyl group, an isobutyl group, a tert-butyl group, a benzyl group, a neopentyl group, a hexyl group, and a cyclohexyl group; an alkenyl groups such as a vinyl group, an allyl group, a propenyl group, an isopropenyl group, a butenyl group and a cyclohexyl group; aryl groups such as a phenyl group, a tolyl group, a xylyl group and a naphthyl group; aralkyl groups such as a styryl group, a benzyl group, a phenylethyl group and a phenylpropyl; and any of these hydrocarbon groups at least part of the hydrogen atoms of which has been substituted with a halogen atom such as a fluorine atom and a chlorine atom or with a nitrile group, e.g., a chloromethyl group, a chloropropyl group, a bromoethyl group, a trifluoropropyl group and a cyanoethyl group. If especially necessary in view of properties, part of $R^1$ (usually not more than 1 mole % of $R^1$) may be a hydroxyl group or groups. Of these examples, substituted or unsubstituted alkyl groups (in particular, a methyl group) are preferred in view of the readiness for synthesis, the easiness to handle and the ability to endow the composition with good curing properties. Also, the letter symbol n, showing the degree of polymerization, is an integer of 150 or more, and may preferably selected within the range of from 150 to 20,000, and more preferably from 200 to 10,000. If n is less than 150, the film formed after curing may be brittle, and may be unable to correspond to any deformation of the substrate, resulting in a difficulty to handle. So long as the n is within the above range, the above organopolysiloxane may be used in combination of two or more types.

Component (B)

The component-(B) organohydrogenpolysiloxane used in the composition of the present invention is a compound having at least three, preferably 3 to 100 and more preferably 3 to 50 hydrogen atoms bonded to silicon atoms, and is a component that reacts with the hydroxyl groups bonded to silicon atoms in the component (A) (Si—OH groups) in the presence of the component-(D) metal fatty acid described later, to act as a cross-linking agent that provides the film with a three-dimensional network structure. There are no particular limitations on the molecular structure of this organohydrogenpolysiloxane, and it maybe any of straight-chain, branched, cyclic and three-dimensional.

As the organohydrogenpolysiloxane, those represented by the following general compositional formula (I) may particularly be used.

$$R^3{}_aH_bSiO_{(4-a-b)/2} \qquad (I)$$

Here, a and b are numbers satisfying $0.5<a<2$, $0.02 \leq b \leq 1$, and $0.7<a+b<3$. The number of silicon atoms in one molecule is 2 to 300, and preferably 4 to 100.

$R^3$ represents a substituted or unsubstituted monovalent hydrocarbon group, preferably those having 1 to 8 carbon atoms, which include the same groups as those for the above $R^1$. Stated specifically, they are exemplified by alkyl groups such as a methyl group, an ethyl group, a propyl group, an isopropyl group, a butyl group, an isobutyl group, a tert-butyl group, a benzyl group, a neopentyl group, a hexyl group, and a cyclohexyl group; an alkenyl groups such as a vinyl group, an allyl group, a propenyl group, an isopropenyl group, a butenyl group and a cyclohexyl group; aryl groups such as a phenyl group, a tolyl group, a xylyl group and a naphthyl group; aralkyl groups such as a styryl group, a benzyl group, a phenylethyl group and a phenylpropyl; and any of these hydrocarbon groups at least part of the hydrogen atoms of which has been substituted with a halogen atom such as a fluorine atom and a chlorine atom or a nitrile group, e.g., a chloromethyl group, a chloropropyl group, a bromoethyl group, a trifluoropropyl group and a cyanoethyl group. If especially necessary in view of properties, part of $R^3$ (usually not more than 1 mole % of $R^3$) may be a hydroxyl group or groups. In view of the readiness for synthesis, $R^3$ may preferably be a substituted or unsubstituted alkyl group, in particular, a methyl group.

The component (B) is mixed in an amount ranging from 1 to 30 parts by weight, and preferably from 2 to 25 parts by weight, based on 100 parts by weight of the component (A). If this component is mixed in an amount less than 1 part by weight, the composition may insufficiently cure, resulting in no film strength required. If on the other hand it is in an amount more than 30 parts by weight, excess Si—H bonds may remain to cause changes in properties with time.

Component (C)

The component (C) is a compound selected from the group consisting of an organosilane having in one molecule at least two, preferably two or three, alkoxyl groups bonded to silicon atoms and containing at least one primary amino group bonded to a silicon atom through an alkylene group and a partial hydrolysis-condensation product thereof. This is a component having the action to impart a good adhesion to substrates and, as mentioned previously, to react with the C=O group in the component-(E) to form the water necessary for condensation and curing (i.e., the action to accelerate curing and adhesion development) in the composition of the present invention. This component (C) also has the action to impart a lubricity to the film after curing. Incidentally, the partial hydrolysis-condensation product is meant to be a partial hydrolysis-condensation product in which at least one, preferably two or more, alkoxyl group(s) remain(s) in the organosilane.

The alkoxyl group may preferably those having 1 to 8 carbon atoms, and particularly 1 to 6 carbon atoms, as exemplified by a methoxyl group, an ethoxyl group, an isopropoxyl group, a butoxyl group, an isobutoxyl group, a methoxyethoxyl group and an ethoxyethoxyl group. In view of the readiness for synthesis, those having a methoxyl group or an ethoxyl group are preferred. The alkylene group may preferably be those having 1 to 8 carbon atoms, and particularly 1 to 6 carbon atoms, as exemplified by a methylene group, an ethylene group, a propylene group, a tetramethylene group, an hexamethylene group and a methylethylene group; preferably a propylene group and an ethylene group, and particularly preferably a propylene group. In addition to the alkoxyl group and the primary amino group bonded through an alkylene group, the component-(C) organosilane may contain an organic group bonded to a silicon atom. Such an organic group may include the same substituted or unsubstituted monovalent hydrocarbon group as those exemplified for the group $R^1$, preferably substituted or unsubstituted alkyl groups, and more preferably a methyl group.

As specific examples of the component (C), it may include organosilanes such as γ-aminopropyltrimethoxysilane, γ-aminopropylmethyldimethoxysilane, γ-aminopropyltriethoxysilane, γ-aminopropylmethyldiethoxysilane, N-β-aminoethyl-γ-aminopropyltrimethoxysilane and N-β-aminoethyl-γ-aminopropyltriethoxysilane, and/or partial hydrolysis-condensation products thereof. Of these, γ-aminopropyltrimethoxysilane, γ-aminopropyltriethoxysilane and partial hydrolysis-condensation products thereof are preferred. In particular, γ-aminopropyltriethoxysilane and partial hydrolysis-condensation products thereof are preferably used.

The component (C) is mixed in an amount ranging from 5 to 150 parts by weight, and preferably from 10 to 100 parts by weight, based on 100 parts by weight of the component (A). If this component is mixed in an amount less than 5 parts by weight, the composition may have insufficient adhesion properties. If on the other hand it is in an amount more than 150 parts by weight, the composition may poorly cure and also the film formed after curing may have a poor mechanical strength.

Component (D)

The component-(D) metal fatty acid salt is a catalyst that accelerates dehydration condensation reaction between the hydroxyl groups of the component-(A) diorganopolysiloxane both-side terminated with hydroxyl groups and the Si—H linkages of the component-(B) organohydrogenpolysiloxane. Such a catalyst may preferably include fatty acid salts of tin, zinc or iron, as specifically exemplified by compounds having organic groups bonded directly to metal, such as dibutyltin diacetate, dibutyltin dioctate, dibutyltin dilaurate, dibutyltin dioleate, dibutyltin distearate, tributyltin dilaurate, dioctyltin diacetate, dioctyltin dilaurate and diethyltin dioleate; and compounds having no organic groups bonded directly to metal, such as tin octanoate, iron octanoate and tin octanoate.

The component (D) metal fatty acid salt is mixed in an amount ranging from 0.1 to 15 parts by weight, and preferably from 0.5 to 10 parts by weight, based on 100 parts by weight of the component (A). If this component is mixed in an amount less than 0.1 part by weight, its catalytic function may not sufficiently be exhibited to cause poor curing. If on the other hand it is in an amount more than 15 parts by weight, the reaction may proceed too fast to ensure any pot life.

Component (E)

The component (E) of the present invention is an organic compound having at least one C=O group bonded to a carbon atom in one molecule. This is a component having, as mentioned previously, to react with the component-(C) primary-amino-group-containing organosilane and/or a partial hydrolysis-condensation product thereof to form the water necessary for condensation and curing (i.e., the action to accelerate curing and adhesion development) in the composition of the present invention. There are no particular limitations on this organic compound having a C=O group, so long as it is capable of reacting with the primary amino groups of the component-(C). Preferred are ketones such as acetone, methyl ethyl ketone, acetophenone and cyclohexanone; and β-keto esters such as ethyl acetoacetate, propyl acetoacetate and butyl acetoacetate. Ketones are particularly preferred.

Any of The component (E) may be used alone or in combination of two or more types without regard to the types.

The component (E) is present in such an amount that the C=O group is in a content ranging from 0.001 to 10 moles, and preferably from 0.01 to 1 mole per mole of the primary amino group contained in the component (C).

Component (F)

The organopolysiloxane composition of the present invention may further contain as component (F) a non-reactive diorganopolysiloxane represented by the general formula (2):

$$R^2(R^2{}_2SiO)_mR^2 \qquad (2)$$

wherein $R^2$ represents a monovalent substituted or unsubstituted hydrocarbon group, and m represents an integer of 150 or more.

This diorganopolysiloxane is non-reactive and does not contain in the molecule any hydroxyl group bonded to a silicon atom. This is a component that imparts higher lubricity to the cured film and also imparts a good wear resistance thereto. The group represented by $R^2$ is exemplified by a substituted or unsubstituted hydrocarbon group having 1 to 8, preferably 1 to 6, carbon atoms like the group represented by $R^1$. In view of the readiness for synthesis, substituted or unsubstituted alkyl groups are preferred. In particular, a methyl group is preferred. Letter symbol m is an integer of 150 or more, preferably from 150 to 20,000, and more preferably from 200 to 10,000. It is especially preferable for the m to be the same as, or more than, the n in the component (A).

The component (F) may preferably be mixed in an amount of from 5 to 80 parts by weight, and particularly preferably from 5 to 60 parts by weight, based on 100 parts by weight of the component (A). If this component is mixed in an amount less than 5 parts by weight, the cured film may have low lubricity and wear resistance. If on the other hand it is in an amount more than 80 parts by weight, the cured film formed may have a low adhesion, rather resulting in a poor wear resistance in some cases.

Other components

In the organopolysiloxane composition of the present invention, various additives may optionally be compounded so long as the object of the present invention is not damaged. As the additives, usable are a filler, an inorganic pigment, an ultraviolet light absorber, an adhesion auxiliary agent (an additive for improving adhesion to substrates) and so forth.

The filler may include, e.g., reinforcing fillers such as fumed silica, precipitated silica, hydrophobic products of these, and resins of various types such as silicone resin; and non-reinforcing fillers such as silica aerogel, pulverized quartz and diatomaceous earth. The silicone resin may include, e.g., silicone resins consisting essentially of an $R_3SiO_{1/2}$ unit, an $SiO_2$ unit and/or $RSiO_{3/2}$. In particular, those having in the molecule an SiOR group (wherein R is the same substituted or unsubstituted monovalent hydrocarbon group as those exemplified by for the group $R^1$, and preferably a methyl group, a vinyl group, a phenyl group or a trifluoropropyl group) are preferred.

Any of these fillers may be used alone or in combination of two or more types.

The inorganic pigment may include carbon black and iron oxides. The ultraviolet light absorber may include carbon black and benzotriazole. Both the inorganic pigment and the ultraviolet light absorber may each be used alone or in combination of two or more types.

The adhesion auxiliary agent may include, e.g., reaction products of amino-group-containing organoalkoxysilanes such as γ-aminopropyltrimethoxysilane and γ-aminopropyltriethoxysilane with epoxy-group-containing organoalkoxysilanes such as γ-glycidoxypropyltrimethoxysilane (i.e., reaction products of amino groups with epoxy groups) or partial hydrolysis-condensation products thereof; and reaction products of amino-group-containing organoalkoxysilanes such as γ-aminopropyltrimethoxysilane and γ-aminopropyltriethoxysilane with acryloxy- or methacryloxy-group-containing organoalkoxysilanes such as γ-acryloxypropyltrimethoxysilane and γ-methacryloxypropyltrimethoxysilane (i.e., reaction products of amino groups with (meth)acryloxy groups) or partial hydrolysis-condensation products thereof. Any of these adhesion auxiliary agents may also be used alone or in combination of two or more types.

Preparation of composition

The organopolysiloxane composition of the present invention can readily be prepared by mixing the above respective components uniformly. In usual instances, a mixture of the components (A), (B), (E) and optionally (F), the component (C) and the component (D) may be kept stored separately and the three may be mixed when used, to prepare the composition.

Use of composition

The organopolysiloxane composition of the present invention may be coated on substrates of various types, in particular, on the surfaces of rubber substrates, followed by curing to form a cured film by the method show below, and can be used as an article. When the composition is coated, the composition may be used as it is, or a composition with a high viscosity may be diluted with an organic solvent when used. Such an organic solvent is exemplified by n-hexane, n-heptane, cyclohexane, industrial gasoline, petroleum naphtha, isoparaffin, benzene, toluene, xylene, isopropyl alcohol, butyl alcohol and mixtures of any of these. Of these, industrial gasoline, petroleum naphtha, isoparaffin or a mixture of any of these with isopropyl alcohol is preferred. These organic solvents may appropriately be selected in accordance with the desired viscosity of the composition used.

The composition may be coated on the substrate surface by any methods conventionally employed, e.g., by dip coating, spray coating, brush coating, knife coating and roll coating.

The wet coating thus formed may be cured by leaving it at room temperature, or by heating a little, in particular, heating for 30 seconds to 30 minutes at a temperature of from 60 to 200° C. Thus, a cured film having good adhesion, lubricity and wear resistance can be formed on the substrate surface.

The composition of the present invention can be applied to various substrates such as inorganic substrates made of glasses, ceramics or metals and organic substrates made of rubbers or plastics. In particular, it is useful for the composition to be applied to rubber substrates. As the rubber substrates, usable are, e.g., natural rubbers, or synthetic rubbers such as SSR, NBR, chloroprene, IIR, EPDM (ethylene-propylene copolymer), urethane rubber and chlorosulfonated polyethylene. In particular, EPDM is preferred.

EXAMPLES

The present invention will be described below in greater detail by giving Examples and Comparative Examples. The present invention is by no means limited to the following Examples. In the following examples, "part(s)" refers to "part(s) by weight" in all occurrences.

Example 1

To 1,300 parts of industrial gasoline (No. 2), 100 parts of dimethylpolysiloxane both-side terminated with hydroxyl groups represented by the following average compositional formula:

HO(CH$_3$)$_2$SiO[(CH$_3$)$_2$SiO]$_{5998}$Si(CH$_3$)$_2$OH and 15 parts of dimethylpolysiloxane represented by the following average compositional formula:

(CH$_3$)$_3$SiO[(CH$_3$)$_2$SiO]$_{5998}$Si(CH$_3$)$_3$ to dissolve them. To the solution thus obtained, 5 parts of methylhydrogenpolysiloxane represented by the following average compositional formula:

(CH$_3$)$_3$SiO[(CH$_3$)HSiO]$_{48}$Si(CH$_3$)$_3$ and 50 parts of methyl ethyl ketone were added, and these were mixed with stirring. To the mixture thus obtained, 30 parts of γ-aminopropyltriethoxysilane and as an adhesion auxiliary agent 60 parts of a reaction product of 22 parts of γ-aminopropyltriethoxysilane with 22 parts of γ-glycidoxypropyltrimethoxysilane (an epoxy-group-containing organoalkoxysilane) were added, and these were mixed with stirring. Finally, 10 parts of dibutyltin diacetate was added and mixed to obtain a gasoline solution of a treating composition.

Example 2

A treating-composition gasoline solution was obtained in the same manner as in Example 1 except that 50 parts of the methyl ethyl ketone was replaced with 50 parts of cyclohexanone.

Comparative Example 1

A treating composition was obtained in the same manner as in Example 1 except that 50 parts of the methyl ethyl ketone was not added.

Comparative Example 2

A treating composition was obtained in the same manner as in Example 1 except that 5 parts of the methylhydrogenpolysiloxane was not added.

Example 3

A treating composition was obtained in the same manner as in Example 1 except that 15 parts of the dimethylpolysiloxane represented by the average compositional formula:

(CH$_3$)$_3$SiO[(CH$_3$)$_2$SiO]$_{5998}$Si(CH$_3$)$_3$ and 60 parts of the adhesion auxiliary agent were not added.

Adhesion test

Each treating composition thus obtained was spray-coated on the surface of an EPDM solid. This was cured for 3 hours, 6 hours, 8 hours, 12 hours, 18 hours and 24 hours in this order under conditions of 20° C./55% RH, and thereafter the coatings formed were scraped with a microspatula to thereby evaluate their adhesion. Results obtained are shown in Table 1.

TABLE 1

| Adhesion test | Example 1 | Example 2 | Comparative Example 1 | Comparative Example 2 | Example 3 |
|---|---|---|---|---|---|
| 3 hours | C | C | C | C | C |
| 6 hours | A | A | C | C | A |
| 8 hours | A | A | C | C | A |
| 12 hours | A | A | C | C | A |
| 18 hours | A | A | C | C | A |
| 24 hours | A | A | A | C | A |

Remarks

A: Good adhesion, C: Peeled.

As described above, according to the room temperature curable organopolysiloxane composition of the present invention, the water produced in the system as a result of the reaction of the primary amine of the component (C) with the C=O group of the component (E) is utilized and the dehydration condensation reaction using the component-(B) organohydrogenpolysiloxane in combination is also utilized. Thus, cured films having superior tack-free properties, lubricity and wear resistance can be formed on the surfaces of various substrates in higher rapid-curing performance (in particular, deep-curing performance) and rapid adhesion development than any conventional coating compositions of this type.

What is claimed is:

1. A room temperature curable organopolysiloxane composition comprising:
   (A) 100 parts by weight of a diorganopolysiloxane both-side terminated with hydroxyl groups, represented by the formula (1):

$$HO(R^1{}_2SiO)_nH \tag{1}$$

wherein $R^1$ represents a monovalent substituted or unsubstituted hydrocarbon group, and n represents an integer of 150 or more;
   (B) from 1 part by weight to 30 parts by weight of an organohydrogenpolysiloxane having in one molecule at least three hydrogen atoms bonded to silicon atoms;
   (C) from 5 parts by weight to 150 parts by weight of a compound selected from the group consisting of an organosilane having in one molecule at least two alkoxyl groups bonded to silicon atoms and containing at least one primary amino group bonded to a silicon atom through an alkylene group and a partial hydrolysis-condensation product thereof;
   (D) from 0.1 part by weight to 15 parts by weight of a metal fatty acid salt; and
   (E) an organic compound having at least one C=O group in one molecule, capable of reacting the primary amino group of the component-(C) to form water; the compound being in such an amount that the C=O group is present in a content of from 0.001 mole to 10 moles per mole of the primary amino group of the component (C).

2. The room temperature curable organopolysiloxane composition according to claim 1, wherein in the formula (2) $R^1$ represents an alkyl group and n represents an integer of 150 to 20,000.

3. The room temperature curable organopolysiloxane composition according to claim 1, the organohydrogenpolysiloxane of the component (B) is represented by the following compositional formula (I):

$$R^3{}_aH_bSiO_{(4-a-b)/2} \tag{I}$$

wherein a and b are numbers satisfying $0.5<a<2$, $0.02 \leq b \leq 1$, and $0.7<a+b<3$, and contains 2 to 300 silicon atoms.

4. The room temperature curable organopolysiloxane composition according to claim 3, wherein in the formula (I) $R^3$ represents an alkyl group.

5. The room temperature curable organopolysiloxane composition according to claim 1, wherein in the component (C) the alkoxyl groups are independently a methoxyl group or an ethoxy group, and the alkylene group is a propylene group or an ethylene group.

6. The room temperature curable organopolysiloxane composition according to claim 1, wherein the component (C) is selected from the group consisting of γ-aminopropyltrimethoxysilane, γ-aminopropylmethyldimethoxysilane, γ-aminopropyltriethoxysilane, γ-aminopropylmethyldiethoxysilane, N-β-aminoethyl-γ-aminopropyltrimethoxysilane, N-β-aminoethyl-γ-aminopropyltriethoxysilane, and partial hydrolysis-condensation products thereof.

7. The room temperature curable organopolysiloxane composition according to claim 1, wherein the metal fatty acid salt of the component-(D) is selected from the group consisting of fatty acid salts of tin, zinc and iron.

8. The room temperature curable organopolysiloxane composition according to claim 1, wherein the organic compound of the component (E) is a ketone or a β-keto ester.

9. The room temperature curable organopolysiloxane composition according to claim 1, the components (B), (C) and (D) are present in amounts of 2–25 parts by weight, 10–100 parts by weight and 0.5–10 parts by weight, respectively, and the component (E) is present such that the C=O group of the component (E) is present in a content ranging from 0.01 to 1 mole per mole of the primary amino group contained in the component (C).

10. The room temperature curable organopolysiloxane composition according to claim 1, which further comprises as component (F) a non-reactive diorganopolysiloxane represented by the formula (2):

$$R^2(R^2{}_2SiO)_mR^2 \tag{2}$$

wherein $R^2$ represents a monovalent substituted or unsubstituted hydrocarbon group, and m represents an integer of 150 or more, in an amount of 5 to 80 parts by weight per 100 parts by weight of the component (A).

11. The room temperature curable organopolysiloxane composition according to claim 10, wherein the component (F) is present in an amount of from 5 to 60 parts by weight, based on 100 parts by weight of the component (A).

12. A cured film formed by curing the organopolysiloxane composition according to claim 1.

13. An article comprising a substrate and a cured film formed on the substrate, said cured film being formed by curing the organopolysiloxane composition according to claim 1.

14. The room temperature curable organopolysiloxane composition according to claim 2, wherein $R^1$ in the formula (2) has 1 to 8 carbon atoms.

15. The room temperature curable organopolysiloxane composition according to claim 14, wherein $R^1$ in the formula (2) has 1 to 6 carbon atoms.

16. The room temperature curable organopolysiloxane composition according to claim 1, wherein $R^1$ is substituted by halogen, nitrile or hydroxy.

17. The room temperature curable organopolysiloxane composition according to claim 2, wherein n represents an integer of 200 to 10,000.

18. The room temperature curable organopolysiloxane composition according to claim 7, wherein said metal fatty acid salt is selected from the group consisting of dibutyltin diacetate, dibutyltin dioctate, dibutyltin dilaurate, dibutyltin dioleate, dibutyltin distearate, tributyltin dilaurate, dioctyltin diacetate, dioctyltin dilaurate, diethytlin dioleate, tin octanoate and iron octanoate.

19. The room temperature curable organopolysiloxane composition according to claim 8, wherein said organic compound of the component (E) is a ketone selected from the group consisting of acetone, methyl ethyl ketone, acetophenone and cyclohexanone.

20. The room temperature curable organopolysiloxane composition according to claim 8, wherein said organic compound of the component (E) is a β-keto ester selected from the group consisting of ethyl acetoacetate, propyl acetoacetate and butyl acetoacetate.

21. The article according to claim 13, wherein said substrate is an inorganic substrate.

22. The article according to claim 21, wherein said inorganic substrate is made of glass, ceramic or metal.

23. The article according to claim 21, wherein said substrate is an organic substrate.

24. The article according to claim 23, wherein said organic substrate is made of rubber, which rubber is natural or synthetic.

25. The article according to claim 24, wherein said rubber is synthetic; and comprises SSR, NBR, chloroprene, IIR, EPDM, urethane rubber or chlorosulfonated polyethylene.

* * * * *